(12) United States Patent
Youngs et al.

(10) Patent No.: US 6,908,269 B1
(45) Date of Patent: Jun. 21, 2005

(54) DYNAMIC CARGO HOOKS FOR AUTOMOTIVE VEHICLES

(75) Inventors: Bruce Youngs, Novi, MI (US); Curt Aumiller, Dearborn, MI (US); Chelsia Ka Po Lau, Canton, MI (US); Nicholas Waskul, Fenton, MI (US); Richard Beck, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/604,332

(22) Filed: Jul. 11, 2003

(51) Int. Cl.⁷ .................................................. B60P 7/08
(52) U.S. Cl. ................. 410/100; 410/97; 410/107; 410/109; 410/111; 410/112; 410/116
(58) Field of Search ............... 410/96–97, 100, 410/106–113, 116; 224/568, 925; 248/499

(56) References Cited

U.S. PATENT DOCUMENTS

| | | | |
|---|---|---|---|
| 2,756,693 A * | 7/1956 | Frost | 410/116 |
| 3,438,673 A | 4/1969 | Nelson | 410/118 |
| 4,907,921 A * | 3/1990 | Akright | 410/111 |
| 4,964,771 A | 10/1990 | Callihan | 410/118 |
| 5,287,971 A | 2/1994 | Dorman | |
| 5,338,136 A * | 8/1994 | Hetchler | 410/100 |
| 5,415,457 A | 5/1995 | Kifer | |
| 5,769,294 A | 6/1998 | Heinz et al. | |
| 5,961,263 A * | 10/1999 | Nunez | 410/103 |
| 6,007,283 A * | 12/1999 | Labeur | 410/97 |
| 6,030,160 A | 2/2000 | Moore | 410/118 |
| 6,062,452 A | 5/2000 | Kauskey | |
| 6,065,917 A * | 5/2000 | Shambeau et al. | 410/107 |
| 6,109,846 A * | 8/2000 | Davis et al. | 410/100 |
| 6,183,177 B1 * | 2/2001 | Dahlgren | 410/100 |
| 6,287,062 B1 * | 9/2001 | Vallance | 410/97 |
| 6,292,984 B1 * | 9/2001 | Nelson | |
| 6,461,090 B1 * | 10/2002 | Faber et al. | 410/100 |
| 6,749,241 B1 * | 6/2004 | Erlandsson et al. | |

* cited by examiner

*Primary Examiner*—Stephen Gordon
(74) *Attorney, Agent, or Firm*—Gigette M. Bejin; Miller Law Group, PLLC (57) ABSTRACT

A dynamic cargo restraint system has a stationary hook member mounted in a bezel for engagement with a second movable hook member that is stored in a second bezel. The movable hook member is attached to a cord that is engaged with a retraction mechanism housed within the corresponding wall of the cargo area to retract the cord for automatic storage when the movable hook member is not in use. The movable hook member can be threaded through the handles of grocery bags before being attached to the stationary hook member to support the grocery bags in an upright orientation. The hook members and the bezels can be formed in a variety of shapes, and are stored substantially flush with the walls of the cargo area. The stationary hook member can be pivoted within it's bezel to project outwardly therefrom for engagement with the movable hook member.

10 Claims, 6 Drawing Sheets

DYNAMIC CARGO HOOKS FOR AUTOMOTIVE VEHICLES

BACKGROUND OF INVENTION

1. Field of the Invention

This invention relates to the restraint of cargo within the interior of automotive vehicles and, more particularly, to cargo restraint devices that are engagable with cargo to limit movement thereof within an automotive vehicle cargo area.

2. Background of the Invention

The placement of cargo into the cargo area of an automotive vehicle, such as the rear cargo area of a van or sport utility vehicle, is typically placed loosely within the confines of the cargo area, allowing the cargo to shift from one position to another within the interior of the vehicle as the vehicle moves along the highway. A number of devices have been created to restrain the movement of such cargo, including straps, netting and organizers.

A typical usage of the cargo area would be to store groceries that have been placed in bags at the grocery store to transport the groceries from the store to the place of residence. Such grocery bags will often be formed from plastic film and be provided with handles. Such grocery bags are not independently stable and will frequently shift within the confines of the automotive cargo area, often spilling the contents to scatter over the entire cargo area.

A line can be strung from one attachment clasp to another engaging the handles of the grocery bags therebetween to restrain the movement of the grocery bags within the interior of the cargo area. Not only are the grocery bags restricted in movement, but the grocery bags are also maintained in an upright orientation which assists in keeping the groceries within the confines of the grocery bags so the groceries themselves do not roll around within the interior cargo area.

The primary purpose of the cargo hooks is to keep the groceries from shifting around within the interior of the automotive cargo area, thus providing the user or operator of the automobile management of their groceries and other cargo. The use of disconnectable lines, such as bungee cords, to extend from one attachment point to another, intertwining with the grocery bags to restrict their movement, results in the problem of managing and storing the detachable lines.

In U.S. Pat. No. 3,438,673, issued to S. C. Nelson on Apr. 15, 1969, the cargo in the form of large containers, such as luggage and boxes, are restrained from movement within the trunk of an automobile by a line that weaves from one attachment point to another from side to side within the trunk restraining the cargo against the forward wall of the trunk cavity. Similarly, in U.S. Pat. No. 4,964,771, issued to Timothy Callihan on Oct. 23, 1990, cargo is restrained against the front wall of a pickup truck bed by a panel of flexible material that is connected to attachment points on opposing lateral sides of the cargo.

In U.S. Pat. No. 6,062,452, issued to Michael Kauskey on May 16, 2000, the attachment points are formed within a removable wall that is selectively mounted in the back of a pick-up truck and the cargo is restrained from movement by a bungee cord that wraps around the cargo and connects to attachment points on opposite sides of the cargo. The Kauskey patent also teaches that grocery bags having handles can be restrained from movement by hooking the handles of the grocery bags over upwardly extending projections that are formed in the removable wall.

Similar to the Kauskey patent, U.S. Pat. No. 5,287,971, issued to Isidore Dorman on Feb. 22, 1994; U.S. Pat. No. 5,415,457, issued to Harlan Kifer on May 16, 1995; and U.S. Pat. No. 5,769,294, granted to Mark Heinz on Jun. 23, 1998, all are directed to an elevated hook device that engages the handles of grocery bags or other similar devices to hold the bags in an upright orientation. In at least one embodiment of the hook device in the Heinz patent, a movable cover can be deployed to aesthetically hide the hook device when not being utilized.

U.S. Pat. No. 6,030,160, issued to Donal Moore on Feb. 29, 2000, discloses a net cargo system in which the connection points of the cargo net are detachably mounted on retainer hooks that are selectively attachable to the edge of the trunk cavity of an automotive vehicle.

It would be desirable to provide a retractable hook apparatus that when not being deployed is retracted out of sight, but when deployed can extend from one hook apparatus to another to engage cargo therebetween to restrain the movement of the cargo within the confines of the interior cargo area of an automotive vehicle.

SUMMARY OF INVENTION

It is an object of this invention to overcome the aforementioned disadvantages of the known prior art by providing a retractable hook apparatus for restraining cargo in a cargo area in the interior of an automotive vehicle.

It is another object of this invention to provide a cargo restraint system that uses a hook member retracted into a bezel to be extended for engaging cargo before being attached to a second hook member within the cargo area.

It is an advantage of this invention that the cords used to restrain cargo within an interior cargo area of an automobile are stored automatically when the cargo restraint system is not being deployed.

It is a feature of this invention that the cargo restraint system includes a first hook member that is extendible from a first bezel to engage a remote hook member mounted in a second bezel to secure cargo between the two bezels.

It is another feature of this invention that the cargo restraint system can be utilized to maintain grocery bags in an upright orientation while being transported from one location to another.

It is still another feature of this invention that the receiving hook member can be pivotally mounted to retract to a position that is flush with the surface on which the receiving hook is mounted.

It is another advantage of this invention that the receiving hook member when not being utilized will not interfere with any use of the cargo area of the automotive vehicle.

It is yet another feature of this invention that extendible hook member is retractable to a position to be substantially flush with the surface in which the extendible hook member is mounted.

It is still another advantage of this invention that the line attached to the hook member to be selectively engaged with the cargo is automatically stored when the cargo containment system is not being utilized.

It is a further feature of this invention that the line forming part of the cargo containment system is attached to a retraction mechanism that stores the line within the walls of the cargo area.

It is still another object of this invention to provide a cargo restraint system for an automotive vehicle that is operable to restrain the movement of cargo within an automotive cargo area, and which is stored automatically when not being utilized, and that is durable in construction, inexpensive of manufacture, carefree of maintenance, facile in assemblage, and simple and effective in use.

These and other objects, features and advantages are accomplished according to the instant invention by providing a dynamic cargo restraint system that has a stationary hook member mounted in a bezel for engagement with a second movable hook member that is stored in a second bezel. The movable hook member is attached to a cord that is engaged with a retraction mechanism housed within the corresponding wall of the cargo area to retract the cord for automatic storage when the movable hook member is not in use. The movable hook member can be threaded through the handles of grocery bags before being attached to the stationary hook member to support the grocery bags in an upright orientation. The hook members and the bezels can be formed in a variety of shapes, and are stored substantially flush with the walls of the cargo area. The stationary hook member can be pivoted within it's bezel to project outwardly therefrom for engagement with the movable hook member.

BRIEF DESCRIPTION OF DRAWINGS

The advantages of this invention will become apparent upon consideration of the following detailed disclosure of the invention, especially when taken in conjunction with the accompanying drawings wherein:

FIG. 10b is a perspective view of a movable hook member of the type depicted in FIG. 10a;

DETAILED DESCRIPTION

Figure 1:
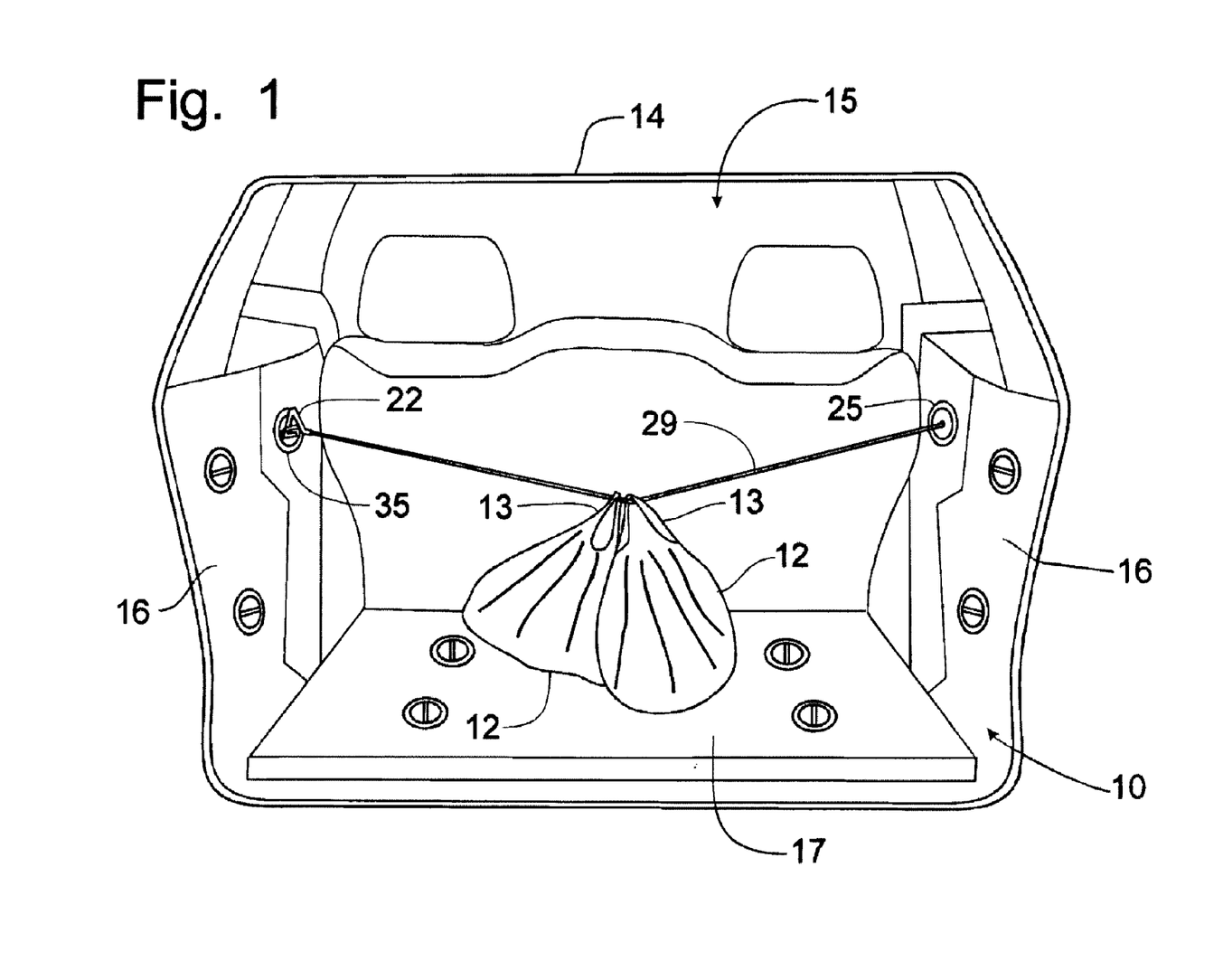
FIG. 1 is an elevational view of the rear cargo area of an automotive vehicle, such as a sport utility vehicle, in which a dynamic cargo restraint system incorporating the principles of the instant invention is depicted, the dynamic cargo restraint system being utilized to support a pair of plastic grocery bags in an upright orientation.
Figure 2:
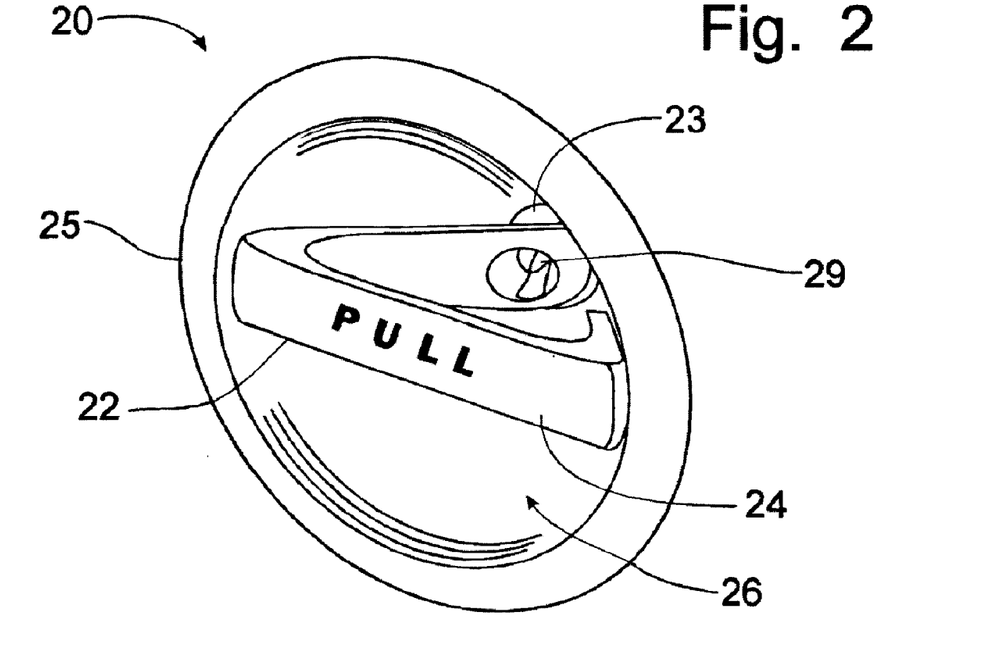
FIG. 2 is an enlarged perspective view of a movable hook member supported in a bezel in a retracted position.
Figure 3:
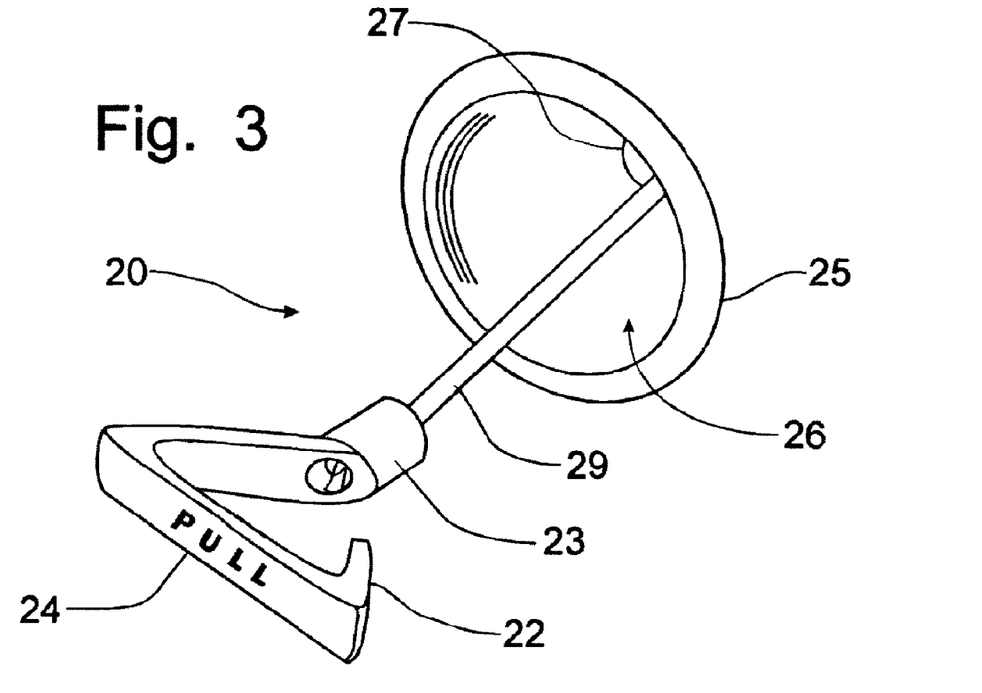
FIG. 3 is a perspective view of the movable hook member depicted in FIG. 2, but having the movable hook member extended from the retracted position housed within the bezel.

Referring to FIGS. 1–7, a cargo restraint system incorporating the principles of the instant invention can best be seen. An application of the cargo restraint system 10 can be seen in FIG. 1 in which the line 29 is threaded between the handles 13 of plastic grocery bags 12 to hold the grocery bags 12 in an upright orientation within the cargo area 15 of an automotive vehicle 14. Referring now to FIGS. 2 and 3, the movable hook assembly 20 can best be seen. The movable hook assembly 20 is supported in a bezel 25 that is mounted in the wall 16 or the floor 17 of the cargo area 15, preferably recessed into the wall 16 or floor 17 so as to be substantially flush with the surface of the wall 16 or floor 17 with the cavity 26 of the bezel 25 being recessed into the wall 16 or floor 17.

Figure 7:
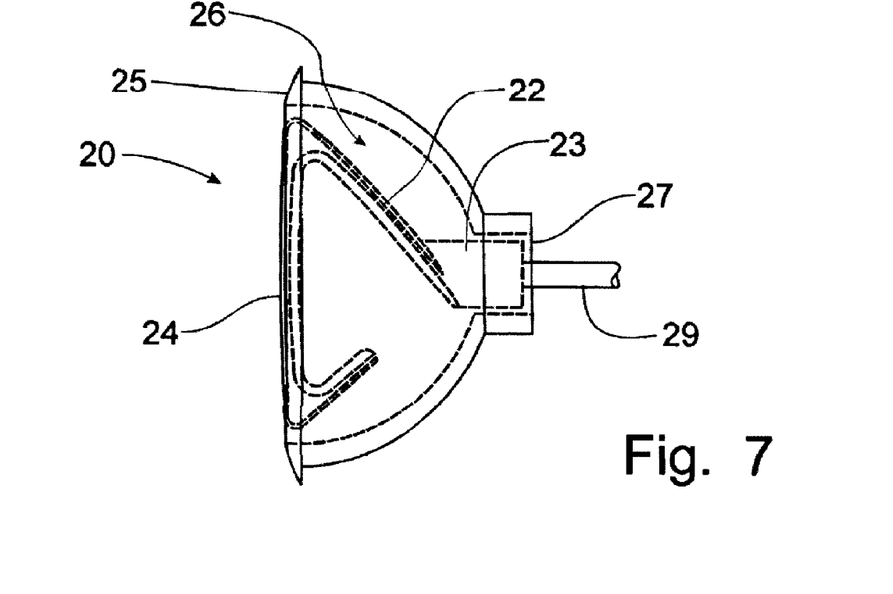
FIG. 7 is a side elevational view of the bezel with the movable hook member retracted therein.

The movable hook assembly 20 includes an open hook member 22 that is connected to a line 29 that extends from an opening 27 at the bottom of the cavity 26 of the bezel 25. The line 29 is preferably attached to a conventional retraction mechanism (not shown) that is spring loaded to maintain tension on the line 29 and to retract the line 29 into the bezel 25 when the open hook member 22 is disengaged from a remote object. Accordingly, the open hook member 22 is drawn into the bezel 25 due to the action of the retraction mechanism (not shown) with the base portion 23 of the open hook member 22 being drawn into the opening 27 so that the transverse handle portion 24 of the open hook member 22 is oriented into the top of the bezel 25 as is depicted in FIG. 7.

Figure 10A:
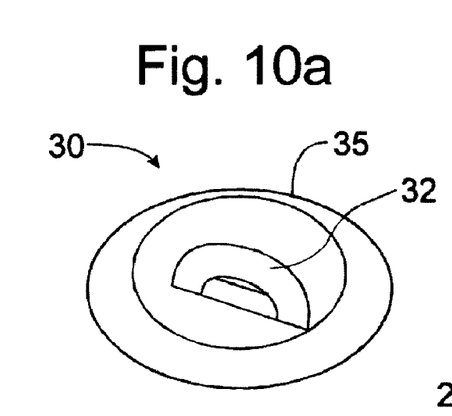
FIG. 10a is a perspective view of another alternative embodiment of a cargo hook member.
Figure 10B:
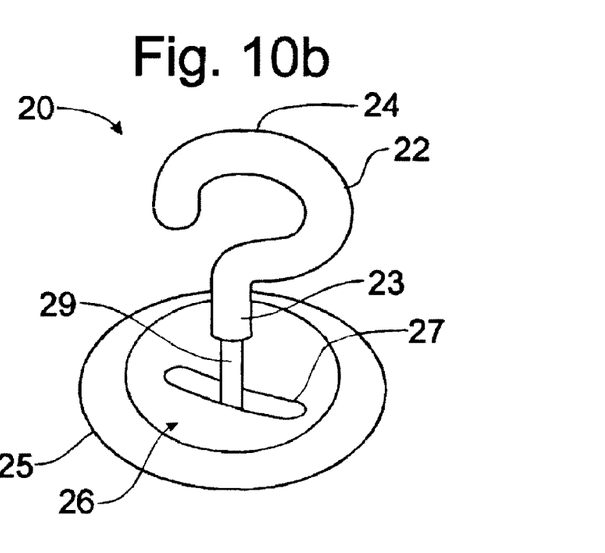
Figures 11A, 11B, 12:
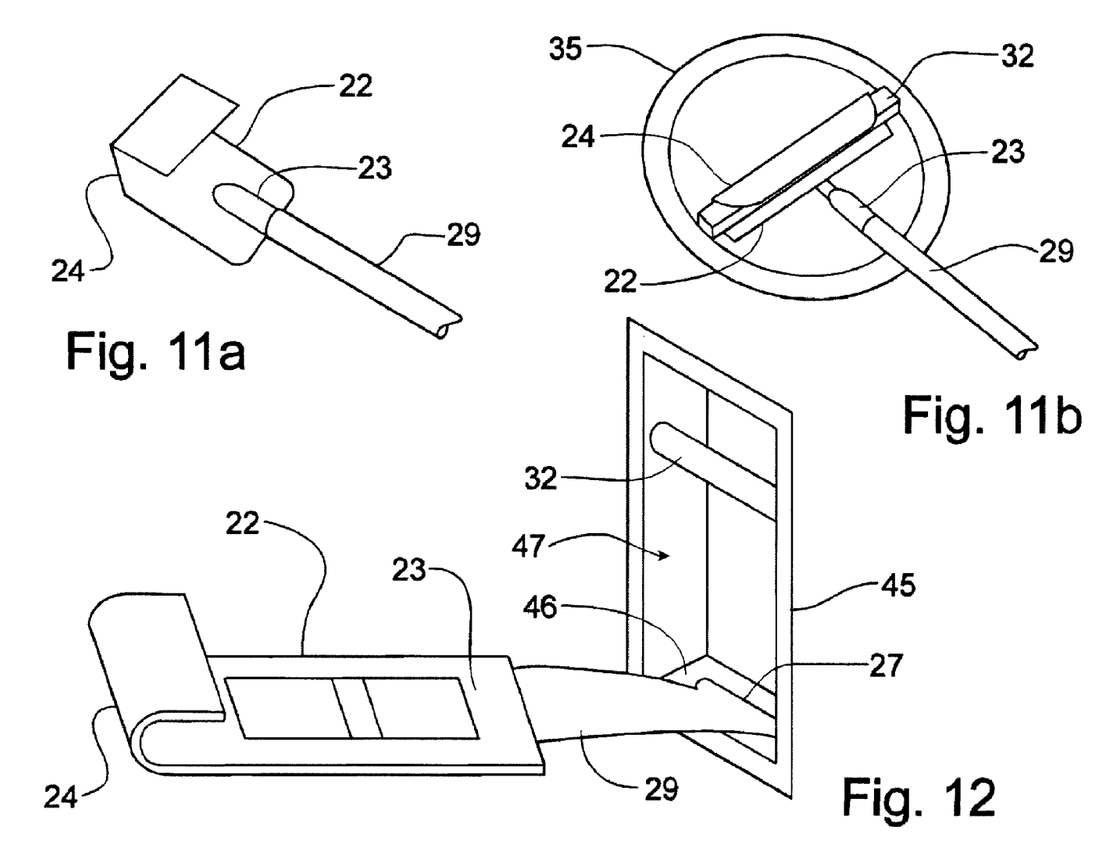
FIG. 11a is a perspective view of a further alternative embodiment of a movable cargo hook member.
FIG. 11b is a perspective view of a variation of the alternative movable hook member embodiment shown in FIG. 11a engaged with a corresponding stationary cargo hook member.
FIG. 12 is a still further embodiment of a cargo restraint member that incorporates into the bezel both a movable hook member and a stationary hook member.

The open hook member 22 can be formed in a variety of configurations, several of which are depicted in FIGS. 2 and 3, in FIGS. 10a and 10b, and in FIGS. 11a and 11b. In the configuration depicted in FIGS. 10a and 10b, the open hook member 22 is formed more as a conventionally shaped hook with a curved handle portion 24. Furthermore, as is depicted in the embodiment of FIGS. 10a and 10b, the bezel 25 can have different configurations corresponding to the shape of the open hook member 22. In FIG. 10b, the shape of the base member 23 has the same diameter as the rest of the open hook member 22 and, therefore, the entire open hook member 22 can slide into the opening 27 leaving only the very top of the handle portion 24 projecting out of the slotted opening 27, as is represented by FIG. 10a, which would have substantially the same appearance as the corresponding stationary hook assembly 30. As a result, the bezel cavity 26 does not need to be as deep as in the embodiment represented in FIGS. 2 and 3. To keep the open hook member 22 from slipping completely within the bezel 25, the retraction mechanism (not shown) must be set to stop the retraction of the line 29 before the hook member disappears beneath the bezel 25, or a stop member (not shown) must be incorporated into the bezel 25 or wall 16 (or floor 17) to stop the retraction of the open hook member 22.

Referring now to FIGS. 11a and 11b, the open hook member 22 does not have to be a sleek curved shape as is depicted in FIGS. 3 and 10b. The open hook member 22 can be formed from bent sheet metal with the handle portion 24 forming a flat, generally rectangular member, and the base portion 23 being adapted to connect to the line 29 in a suitable manner. The configurations of 11a and 11b are similar in formation, but different in actual shape.

Figure 4:
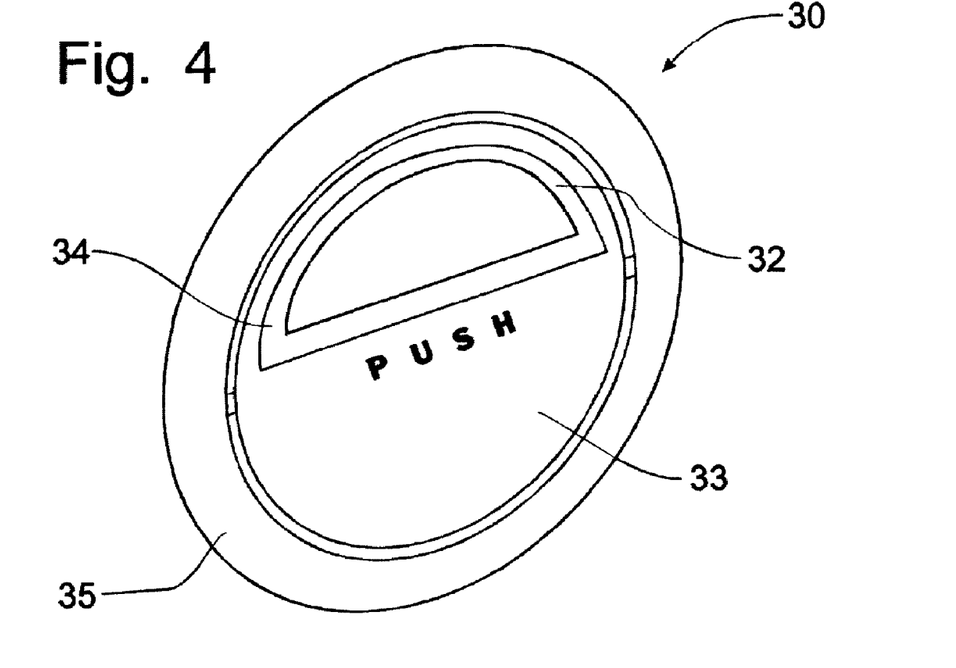
FIG. 4 is an enlarged perspective view of a stationary hook member pivotally supported in a bezel in an inoperative position.
Figure 5:
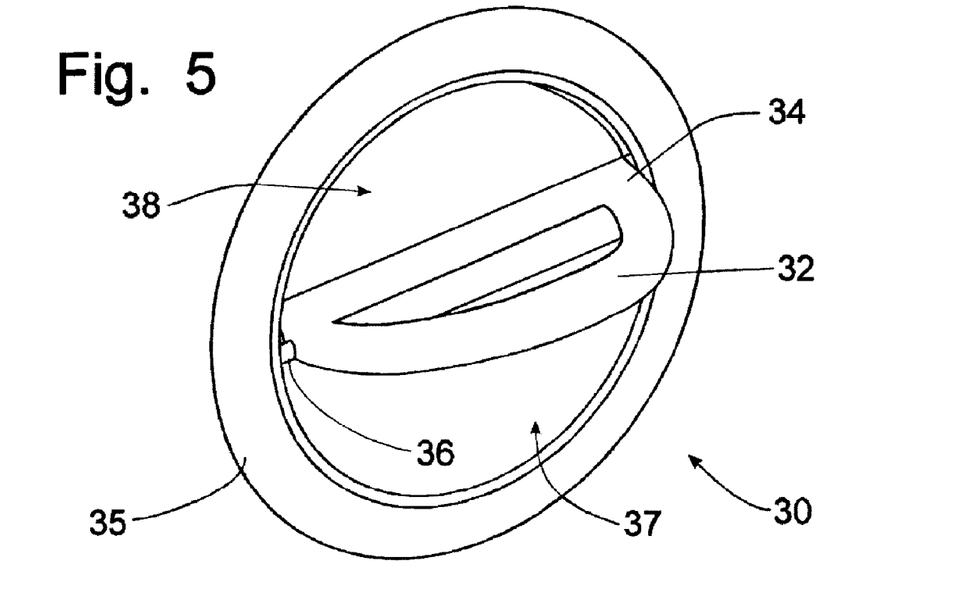
FIG. 5 is a perspective view of the stationary hook member shown in FIG. 4 but with the stationary hook pivoted outward from the bezel for engagement with a movable hook member.

The cooperative opposing part of the cargo restraint system 10 from the movable hook assembly 20 is the stationary hook assembly 30. As best seen in FIGS. 4 and 5, the stationary hook assembly 30 is formed to have an appearance generally matching the appearance of the movable hook assembly 20. The stationary hook assembly 30 also includes a bezel 35 that is recessed into the wall 16 or floor 17 of the cargo area 15 of the automotive vehicle 14 so as to be substantially flush with the surface of the wall 16 or floor 17. The bezel 35 pivotally supports a closed hook member 32 that when pivoted within the bezel 35 extends outwardly from the bezel 35 for engagement with the open hook member 22. Preferably, the closed hook member 32 is formed with a actuator portion 33 that can present a solid surface for engagement thereof, and an engagement portion 34 that is formed with an opening surrounded circumferentially by the closed hook member 32 to permit an appropriate engagement between the open hook member 22 and the closed hook member 32.

Figure 6:
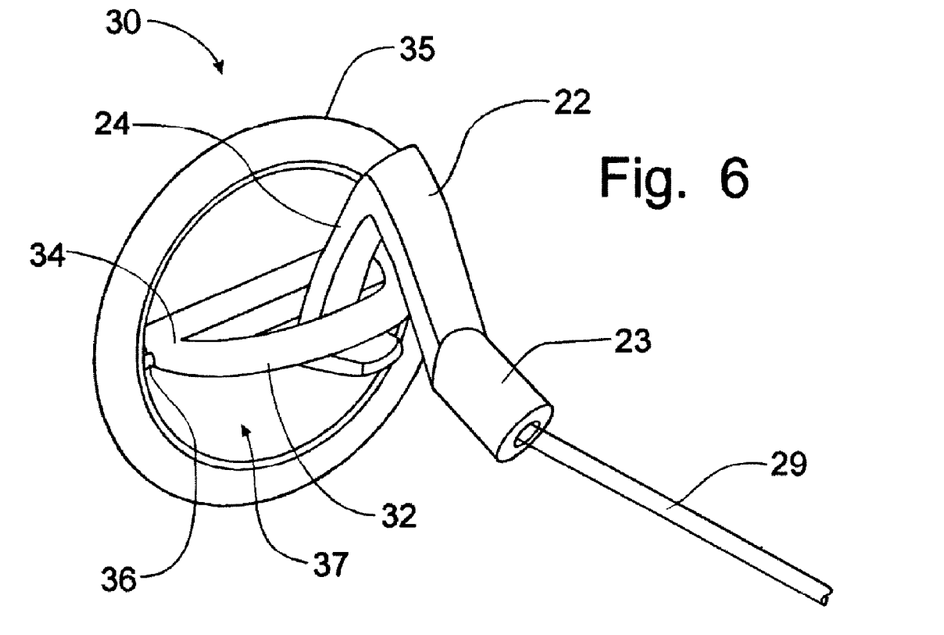
FIG. 6 is a perspective view similar to that of FIG. 5, but depicting the movable hook member of FIG. 3 engaged with the stationary hook member.

Preferably, the pivot 36 supported by the bezel 35 is associated with a return spring (not shown) that biases the pivotal movement of the closed hook member 32 against the bezel 35 into a closed position. Upon depressing the actuator portion 33 into the bezel 35 for the pivotal extension of the closed hook portion 32 outwardly from the bezel 35, the actuator portion 33 retracts into the bezel 35 as the closed hook member 32 projects outwardly. As is best seen in FIG. 6, the open hook member 22 can be engaged with the closed hook member 32 to secure the two hook members 22, 32 together. Before such engagement of the hook members 22, 32, the open hook member 22 would have preferably been threaded through grocery bag handles 13 or around cargo in some manner as to position the line 29 to restraint movement of the cargo in the desired manner, as is depicted in FIG. 1.

Figures 8, 9:
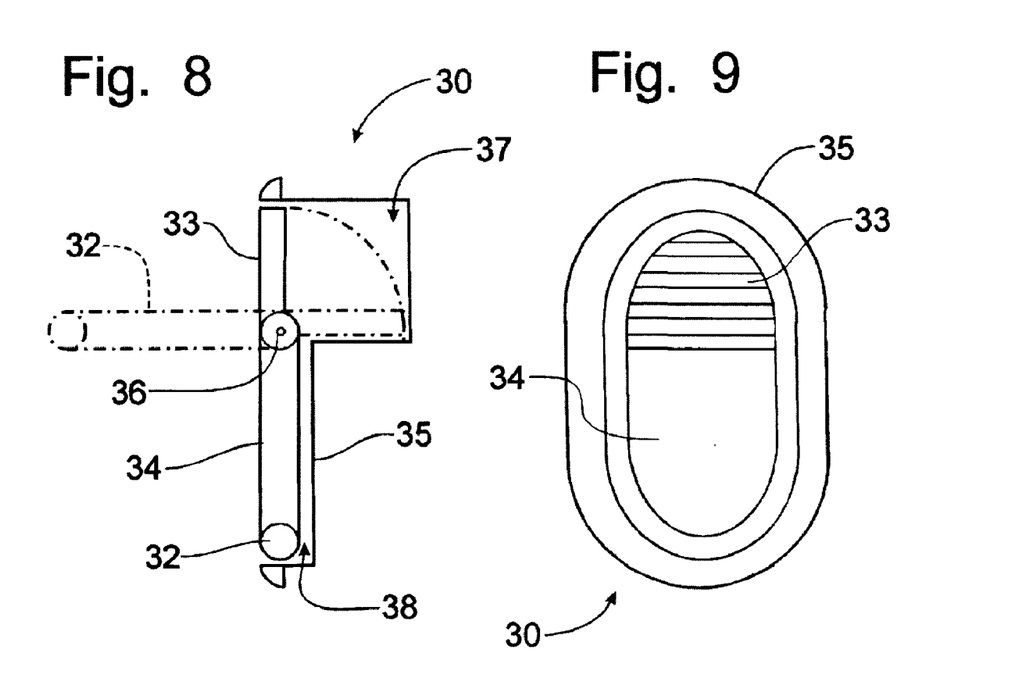
FIG. 8 is a side elevational cut-away view of the bezel for the stationary hook member with the pivotal movement of the stationary hook member being depicted in phantom lines.
FIG. 9 is an elevational view of an alternative stationary hook member embodiment.

As with the different configurations of the movable hook assembly 20, the stationary hook assembly 30 can have as many corresponding configurations, as is depicted in FIGS. 4 and 5, in FIGS. 8 and 9, in FIG. 10a, and in FIG. 11b. In FIG. 10a, the closed hook member 32 would have the same general appearance as the retracted open hook member 22. As seen in FIG. 11b, the closed hook member could also be in the form of a generally rectangular bar that is engagable with a formed open hook member 22 of the style depicted in FIGS. 11a and 11b.

In FIGS. 8 and 9, the stationary hook assembly is configured as an oval, instead of being formed as a circular member as depicted in FIGS. 4 and 5. The bezel 35 can have a dual compartment configuration, with respect to each of the embodiments of FIGS. 4 and 5 and of FIGS. 8 and 9, such that the actuator portion 33 is retracted into a deeper compartment 37 when depressed and pivoted about the pivot 36. Simultaneously, the closed hook member 32 projects outwardly away from the bezel 35 exposing the shallow compartment 38, as is depicted in phantom lines in FIG. 8.

As is depicted in FIG. 12, an alternative configuration has both the closed hook member 32 and the open hook member 22 in the same bezel 45. The open hook member 22 is connected to a line 29, which can be in the form of a flexible strap that is retracted through the side wall 46 of the bezel 45 opposite to the position of the closed hook member 32. As with the other embodiments, a conventional retraction mechanism (not shown) is connected to the line or strap 29 to impose a tension thereon to draw the open hook member 22 and the strap 29 into the bezel 45. The open hook member 22 can be stored in engagement with the closed hook member 32 to close the cavity 47 of the bezel 45. To operate, two of the open hook members, preferably from opposing sides of the cargo area 15 with respect to the cargo being restrained, would need to be utilized to provide an non-engaged closed hook member 32 for engagement. Alternatively, one of the open hook members 22 could be disengaged from its corresponding closed hook member 32 to permit engagement with the opposing open hook member 22, with the first open hook member 22 being retracted against the bezel 45 by the retraction mechanism (not shown).

As is depicted in FIG. 1, a cargo area 15 of a vehicle 14 could be equipped with a number of cargo restraint systems 10, each cargo restraint system 10 being defined as comprising one movable hook assembly 20 and one corresponding stationary hook assembly 30. In fact, several of each of the movable hook assemblies 20 and the stationary hook assemblies 30 could be provided on each upright wall 16 of the cargo area 15, as well as on the floor 17, thus providing great versatility in the utilization of the cargo restraint systems 10 for restraining the movement of cargo within the cargo area 15 of an automotive vehicle 14.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A cargo restraint system for a cargo area of an automotive vehicle comprising:

a stationary hook assembly mounted on a first surface of said cargo area and having a closed hook member, said stationary hook assembly including a first bezel in which said closed hook member is pivotally supported for movement between a retracted closed position and an extended engagement position to facilitate engagement of said closed hook member by a retractable open hook member, said closed hook member having an actuator portion and an engagement portion, said actuator portion retracting into a deep compartment of said first bezel when said engagement portion extends away from said first bezel to facilitate connection with said retractable open hook member, said engagement portion being received within a shallow compartment of said first bezel when pivoted into said retracted closed position; and a movable hook assembly mounted on a second surface of said cargo area and having said retractable open hook member with a line attached thereto that can be extended into engagement with said closed hook member stretching said line from said movable hook assembly to said stationary hook assembly to engage cargo for restraint thereof.

2. The cargo restraint system of claim 1 wherein said movable hook assembly includes a second bezel adapted to receive said retractable open hook member when retracted into said second bezel, said second bezel having an opening therein for the passage of said line.

3. The cargo restraint system of claim 2 wherein said retractable open hook member has a base portion connected to said line and a handle portion engagable with said closed hook member, said second bezel being adapted to receive said retractable open hook member such that said base portion is received adjacent said opening and said handle portion is substantially flush with a circumferential perimeter portion of said second bezel.

4. The cargo restraint system of claim 3 further comprising a retraction mechanism operatively connected to said line to bias said retractable open hook member toward a retracted position received within said second bezel.

5. In a cargo restraint system for a cargo containment area in an automotive vehicle, said cargo restraint system including a stationary hook assembly mounted on a first surface of said cargo area and having a closed hook member, the improvement comprising:

a movable hook assembly mounted on a second surface of said cargo area and having a retractable open hook member with a line attached thereto that can be extended into engagement with said closed hook member stretching said line from said movable hook assembly to said stationary hook assembly to engage cargo for restraint thereof, said movable hook assembly includes a first bezel adapted to receive said open hook member when retracted into said bezel, said first bezel having an opening therein for the passage of said line.

6. The cargo restraint system of claim 5 wherein said open hook member has a base portion connected to said line and a handle portion engagable with said closed hook member, said first bezel being adapted to receive said open hook member such that said base portion is received adjacent said opening and said handle portion is substantially flush with a circumferential perimeter portion of said first bezel.

7. The cargo restraint system of claim 6 further comprising a retraction mechanism operatively connected to said line to bias said open hook member toward a retracted position received within said first bezel.

8. The cargo restraint system of claim 5 wherein said stationary hook assembly is formed with a second bezel in which said closed hook member is pivotally supported for movement between a retracted closed position and an extended engagement position to facilitate engagement of said closed hook member by said open hook member.

9. The cargo restraint system of claim 8 wherein said closed hook member has an actuator portion and a engagement an engagement portion, said actuator portion retracting into said second bezel when said engagement portion extends away from said second bezel to facilitate connection with said open hook member.

10. The cargo restraint system of claim 9 wherein said second bezel has a deep compartment and a shallow compartment, said deep compartment being operable to receive said actuator portion when pivoted into said second bezel.

* * * * *